United States Patent
Kuwata et al.

(10) Patent No.: US 6,906,826 B1
(45) Date of Patent: Jun. 14, 2005

(54) MEDIUM ON WHICH IMAGE MODIFYING PROGRAM IS RECORDED, IMAGE MODIFYING APPARATUS AND METHOD

(75) Inventors: Naoki Kuwata, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/600,416

(22) PCT Filed: Nov. 16, 1998

(86) PCT No.: PCT/JP99/06379

§ 371 (c)(1),
(2), (4) Date: Jul. 17, 2000

(30) Foreign Application Priority Data

Nov. 16, 1998 (JP) .......................................... 10-325000

(51) Int. Cl.⁷ ............................. H04N 1/50; H04N 1/58; H04N 1/60
(52) U.S. Cl. ....................... 358/1.9; 358/3.27; 358/520; 358/527; 358/532
(58) Field of Search ............................... 358/3.24, 3.27, 358/518, 520, 527, 532, 1.9; 382/254, 274, 311, 309

(56) References Cited

U.S. PATENT DOCUMENTS 5,652,663 A * 7/1997 Zelten ........................ 358/447

FOREIGN PATENT DOCUMENTS

| JP | 63-82553 | 4/1988 |
| JP | 4-350778 | 12/1992 |
| JP | 5-153396 | 6/1993 |
| JP | 8-18803 | 1/1996 |

OTHER PUBLICATIONS

International Search Report.
Patent Abstract of Japan 05153396 Jun. 18, 1993.
Patent Abstract of Japan 04350778 Dec. 4, 1992.
Patent Abstract of Japan 63082553 Apr. 13, 1988.
Patent Abstract of Japan 08018803 Jan. 19, 1996.
"Adobe Photoshop A to Z", BNN Bug News Network, Jun. 30, 1993 p. 188–213.

* cited by examiner

*Primary Examiner*—Scott A. Rogers
(74) *Attorney, Agent, or Firm*—Sughrue Mion, PLLC

(57) ABSTRACT

A medium on which an image modifying program is recorded for carrying out image processing on a computer on the basis of image data in which an image is composed of dot-matrix pixels, thereby performing image modification is disclosed. The program accomplishes, on the computer, a modifying parameter computing function of performing a predetermined computing process using image data of each pixel to obtain a modifying parameter for changing a picture quality on the basis of predetermined image processing, a modifying parameter correcting function of obtaining an image modifying instruction by an operator to correct the modifying parameter on the basis of the image modifying instruction, and an image data correcting function of performing the predetermined image processing for the image data on the basis of the modifying parameter.

15 Claims, 15 Drawing Sheets

| BR | $\gamma$ |
|---|---|
| 20 | 1.20 |
| 15 | 1.15 |
| 10 | 1.10 |
| 5 | 1.05 |
| 0 | 1 |
| −5 | 0.95 |
| −10 | 0.90 |
| −15 | 0.85 |
| −20 | 0.80 |

FIG. 11

| RECORD TABLE | | |
|---|---|---|
| COMPENSA-TION ORDER | PARAMETER | |
| 1 | CONTRAST | ～ |
| 2 | CONTRAST | ～ |
| 3 | ( | ～ |
| 4 | ) | ～ |

FIG. 15

MEDIUM ON WHICH IMAGE MODIFYING PROGRAM IS RECORDED, IMAGE MODIFYING APPARATUS AND METHOD

BACKGROUND OF THE INVENTION

1. Field of the Invention

This invention relates to a medium on which an image modifying program is recorded, image modifying apparatus and method, and more particularly to a medium on which an image modifying program is recorded, image modifying apparatus and method in which modifying parameters for image modification are automatically determined.

2. Description of the Prior Art

A digital image has recently been displayed on a display and outputted on printing paper by a printer. Digital image photographed by a digital still camera or image data attained through a scanner is introduced as digital image by starting an image processing software on a computer to be outputted to the display or printer. In many cases, predetermined image processing is carried out for the introduced digital image by utilizing an image modifying function provided in the image processing software.

In the above-described case, an operator performs a predetermined setting regarding various image modifying functions of the image processing software, for example, "saturation," "brightness" and "contrast." Image processing is carried out on the basis of the setting so that an image is displayed on the display or outputted onto printing paper from the printer by utilizing modified image data.

As described above, the operator needs to perform various setting operations for image modifying functions of the image processing software with the image modifying function. However, required working is difficult to understand and troublesome for an average operator. Furthermore, the result of image modification cannot be improved in many cases even when the setting operations are performed.

SUMMARY OF THE INVENTION

The present invention was made in view of the foregoing and an object thereof is to provide a medium on which an image modifying program is recorded, an image modifying apparatus and method which make it possible for an average operator to perform image modification according to his or her preference.

To achieve the object, the invention of claim 1 is a medium on which an image modifying program is recorded for carrying out image processing on a computer on the basis of image data in which an image is composed of dot-matrix pixels, thereby performing image modification, the program accomplishing on the computer a modifying parameter computing function of performing a predetermined computing process using image data of each pixel to obtain a modifying parameter for changing an image quality on the basis of predetermined image processing, a modifying parameter correcting function of obtaining an image modifying instruction by an operator to correct the modifying parameter on the basis of the image modifying instruction, and an image data correcting function of performing the predetermined image processing for the image data on the basis of the modifying parameter.

In the invention of claim 1 constructed as described above, a digital image comprises image data representing an image as dot-matrix pixels. Generally, each pixel is divided into a plurality of element colors, and color intensity of each element color is represented in a multiple of gradation levels. Accordingly, the image can be modified if image data of each pixel is corrected.

Generally speaking, an image is sometimes originally bright though it is dark. Accordingly, an image cannot be modified by evenly increasing a gradation value and image modification necessitates some principle. In the present image processing program, accordingly, as the modifying parameter computing function, a predetermined operation processing is performed using image data of each pixel so that a modifying parameter for changing a picture quality on the basis of predetermined image processing is obtained. More specifically, the predetermined computing process is performed using image data of each actual pixel so that the principle of image processing is obtained. For example, when the computing process which can get the brightness of each pixel is performed, the brightness of an actual image can be found. When the brightness has been found, it can be determined to what degree the image processing for adjustment of brightness should be performed in order that a fine image may be obtained. This degree is represented by a modifying parameter.

However, there is a great difference in the image quality including brightness among individuals. That is, an image has a desirable brightness for one person but might be felt dark for another person. Accordingly, it is difficult to determine a uniform criterion. Furthermore, even when the operation processing is performed using the actual image data, the operation result which can reliably evaluate the brightness of the image is not always obtained. There is a case where different modifying parameters are obtained for images with the same brightness.

Accordingly, as the modifying parameter correcting function, an image modifying instruction by an operator is obtained so that the modifying parameter is corrected on the basis of the image modifying instruction. The instruction is strictly an image modifying instruction for changing the modifying parameter. Accordingly, even if a modifying parameter for rendering the brightness suitable is provided, it does not necessarily instruct as to how actual image data should be brightened. For example, in a case where a modifying parameter for adjusting brightness has automatically been set and a person prefers a brighter thing than usual, an image modifying instruction to render the image brighter is given. On the contrary, in a case where a person prefers a dark image than usual, an image modifying instruction to render the image darker is just given.

Thus, brightness is set at a rough value by the operation processing and the modifying parameter reflecting one's preference is obtained. As a result, in the image data correcting function, the predetermined image modification processing is performed for the image data on the basis of the modifying parameter. There are various manners of image processing and any image processing which can perform a compensation and emphasis processing for image data can be selected.

Furthermore, regarding determination of image quality which is a prerequisite for the image processing, one is adapted to or another is not adapted to the division into what is desired and what is not desired on the basis of a determined threshold. The former includes image contrast and brightness, for example. The latter includes image saturation, color balance and sharpness, for example. The operation improves the image quality for one person but degrades the image quality for another person. Accordingly, the image modifying instruction is not adapted to the division as to improvement and degradation of the image, and a modifying parameter is corrected according to the image modifying instruction by an operator. However, the image modifying instruction should not be limited to types of image processing as an object thereof, and a modifying parameter producing the similar result in the image may be reset. In other words, the operator need not be aware of the value of the modifying parameter, but the present invention encompasses what provides an interface consciously varying the modifying parameter.

On the other hand, the image data as the object may comprise pixels arranged in a dot matrix. Digital images may be taken in from a scanner or digital still camera or may be stored on a recording medium.

In the modifying parameter computing function, a predetermined operation processing is performed using image data of each pixel, and the result of computation becomes a concrete modifying parameter for carrying out a predetermined image processing. Accordingly, it is also a function of detecting a current state of the image. The function of detecting the current state of the image is essential when the image quality is to be changed to a better one. However, a processing time cannot be ignored in a case where the operation processing is carried out for the image data of all the pixels when the number of pixels has become large.

In view of the foregoing, the invention claimed in claim 2 is constructed so that in the medium of claim 1, the modifying parameter calculating function collects by sampling the image data of each pixel according to a predetermined criterion to perform computation on the basis of results of collection, thereby determining the modifying parameter.

The current state of the image can be grasped on the basis of the image data in which predetermined pixels have been thinned out from all the pixels, although only grasping a rough tendency is sufficient. Accordingly, predetermined pixels are picked up from those composing the image data. The predetermined pixels are suitable when a modifying parameter can be determined on the basis of image data thereof.

In the invention of claim 2 constructed as described above, image data of each pixel is picked up and collected according to the predetermined criterion. Accordingly, a processing time required for the operation is reduced as compared with the case where all the pixels are collected. Operation is performed on the basis of the result of collection so that a modifying parameter representative of image quality is determined.

On the other hand, any image processing can be selected when it can perform a compensation and emphasis processing for image data. Accordingly, it can be considered that a plurality of modifying parameters are generally regarded as objects on the premise of a plurality of times of image processing. In this case, the operator causes desired preference to be reflected to match modified image to his or her preference, while selecting a desired one of a plurality of modifying parameters. However, although the setting becomes easy, it becomes difficult when the number of modifying parameters is increased. The setting is difficult particularly when all the preference needs to be reflected at once.

In view of the foregoing, the invention claimed in claim 3 is constructed so that in the medium of claim 1 or 2, the modifying parameter correcting function and the image processing function are repeated on the basis of the image data which has gone through the image processing.

In the invention of claim 3 constructed as described above, the modifying parameter computing function, the modifying parameter collecting function and the image processing function are repeated after the image processing has been performed for the image data on the basis of the collected modifying parameter. Accordingly, only the changing instruction regarding one modifying parameter is given at first and then, changing instructions are repeatedly given while a reflected state of the parameter is being referred to. Consequently, even when a plurality of modifying parameters are provided, they are sequentially set one by one such that the setting becomes easy.

The image quality may be degraded when one operation is added. In this case, a reverse operation is performed for restoration. However, simply returning is convenient. In view of this, the invention claimed in claim 4 is constructed so that in the medium of claim 3, the modifying parameter correcting function records the image modifying instruction by the operator to reproduce the image data at any stage using the recorded image modifying instruction.

Various techniques can be employed for returning to any stage using the recorded image modifying instruction. As one example, former stages may be retraced when reverse conversion of the image processing is possible. Furthermore, even when the reverse conversion is impossible, any stage can be reached by retracing when the operation is repeated from the first stage. Of course, when image modification is always performed on the basis of the first image data, the modifying parameter at any stage may be called out so that the image modification processing is carried out.

In these cases, it is useful to display the image at each stage. Furthermore, an image modified on the basis of the modifying parameter obtained by the operation processing may be displayed and an image of record may be displayed.

Regarding obtaining the image modifying instruction from the operator, an image may only be changed so as to be suitable for his or her preference, and a manner of operation may suitably be changed. As one example, an instruction to directly modify the modifying parameter may be supplied. In this case, since the value of the modifying parameter does not agree with the image quality intuitively, only a tendency of the modification may be instructed.

In view of the foregoing, the invention claimed in claim 5 is constructed so that in the medium of any one of claims 1 to 4, the modifying parameter correcting function obtains a fine adjustment parameter for changing the modifying parameter by fine adjustment to correct the modifying parameter on the basis of the obtained fine adjustment parameter.

The fine adjustment parameter is strictly only for fine adjustment. Accordingly, when the image quality should be changed to a large degree, to what degree the original modifying parameter should be changed can be prevented from becoming indefinite. Furthermore, in changing the modifying parameter instructed for the purpose of slightly changing the image quality, the image quality can be prevented from being changed to a large degree.

The foregoing is premised on the modifying parameter obtained by the operation processing and is an instruction to modify the image so that the modifying parameter is changed. An instruction may be supplied to produce different modifying parameters as of the time of operation processing, instead.

In view of the foregoing, the invention claimed in claim 6 is constructed so that in the recording medium of any one of claims 1 to 4, the modifying parameter correcting function changes the operation processing in the modifying parameter calculating function to thereby change the modifying parameter to be obtained. More specifically, when factors etc. used in the computation of the modifying parameter are referred to as "reference data," the modifying parameter computed by changing the reference data is changed. However, the change in the reference data is not directly reflected. Then, the modifying parameter should be re-computed by the modifying parameter computing function.

Of course, the recording medium may be a magnetic recording one, a magneto-optical one or any software recording medium to be developed in the future. Furthermore, the present invention may take such a replicated form as a primary replicated product, secondary replicated product, etc. In addition, the present invention may be supplied through use of a communication line. Still more, there may be such an arrangement that some parts of the present invention are embodied in software while the other parts thereof are embodiment in hardware. Some parts thereof may be formed as software recorded on a storage medium to be read into hardware as required.

When the image modifying program of the present invention is put to practice, hardware or operating system may be used or may be separated from them. For example, image data needs to be obtained when the operational processing is performed for the data. As a method of accomplishing this, predetermined functions in the operating system may be read out or input from the hardware without being read out. Even when the invention is accomplished with provision of an operating system, it is to be understood that the invention can be practiced only by the program when it is recorded on a medium to be circulated. Furthermore, when the present invention is practiced in the form of software, the invention is accomplished as a medium on which the program is recorded. Thus, the present invention is naturally accomplished as a program itself and the program falls within the scope of the invention.

Thus, the technique for reflecting the operator's preference on the modifying parameter obtained by operational processing. It can be easily understood that the present invention is applicable as a substantial apparatus including a computer in this sense. Accordingly, the invention claimed in each of claims 7 to 12 functions in the same way as described above. That is, the present invention is really effective as a substantial apparatus controlled by a computer. Of course, the image modifying apparatus may be practiced as a single unit or may be incorporated in other equipment to be practiced in another way. Thus, the present invention involves various forms and may suitably be changed.

Furthermore, the present invention resides in a procedure in a case where the processing is performed according to the image modifying program recorded on the medium. It can easily be understood that the invention is applicable as a method. Accordingly, the invention claimed in each of claims 13 to 18 functions in the same way as described above. That is, the present invention should not be limited to a substantial medium and is really effective as a method.

BRIEF DESCRIPTION OF THE DRAWINGS

FIG. 11 shows a correspondence table of value $\gamma$ when the brightness is modified;

FIG. 15 shows a record table.

DETAILED DESCRIPTION OF THE PREFERRED EMBODIMENT

Figure 1:
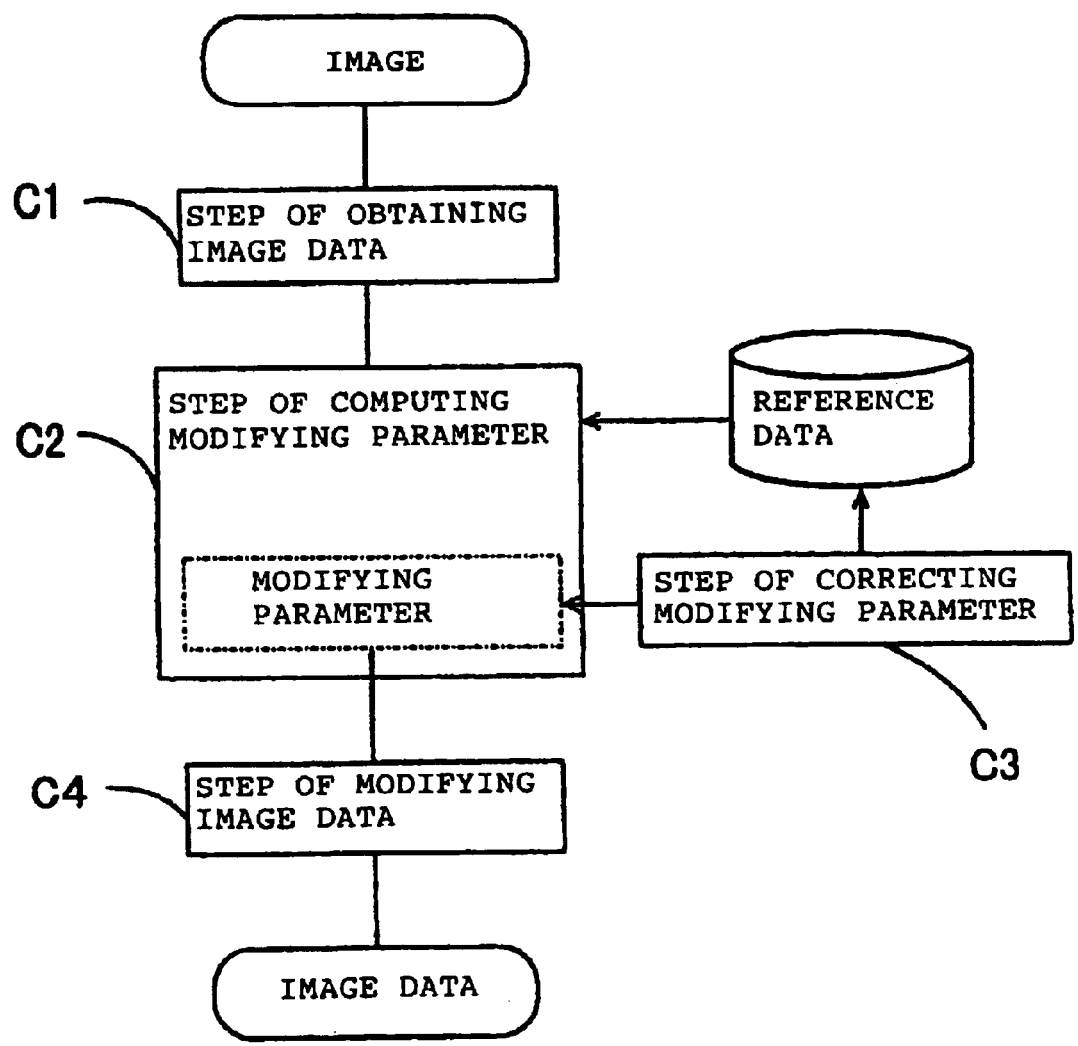
FIG. 1 illustrates a schematic arrangement of an image modifying program in accordance with one embodiment of the present invention.

One embodiment of the present invention will be described with reference to the drawings. FIG. 1 shows a schematic arrangement of the image modifying program of the embodiment in accordance with the present invention. Steps executed by the program include an image data obtaining step C1 of obtaining an image as image data of a predetermined data format composed of pixels in dot-matrix form, a modifying parameter computing step C2 of executing a predetermined tabulation process for each pixel composing the image data obtained at the step C1 and carrying out a predetermined operation process for the result of collection to determine a modifying parameter, a modifying parameter correcting step C3 of applying a fine adjustment to the modifying parameter so that the parameter corresponds to the operator's preference, and an image data modifying step C4 of modifying the image data on the basis of the modifying parameters reflecting the preference of the operator.

At the modifying parameter computing step C2, the predetermined tabulating process is executed for each of the pixels composing the image data, and a preference of the image quality of the image data is obtained from the results of the tabulating process. When the presence of failure in the image quality is recognized from the results of the obtaining, a predetermined modifying parameter is determined so that modification for modifying the image is carried out while the failure being resolved. At the image data modifying step C4, the image modifying process is carried out on the basis of the modifying parameter. At this time, whether the current image quality is good is determined in the sense that failure is resolved, and reference data is used this time. Of course, image quality is not always adapted to the determination as to whether it is good, but the reference data is used to obtain an index of modification. Furthermore, in order that a fine adjustment may be reflected at the modifying parameter correcting step C3, the modifying parameter can be corrected or the reference data can be corrected. In this sense, an object to be corrected at the modifying parameter correcting step C3 includes the aforesaid modifying parameter and reference data. However, the modifying parameter is directly or indirectly modified according to the operation by the operator in each case.

Figure 2:
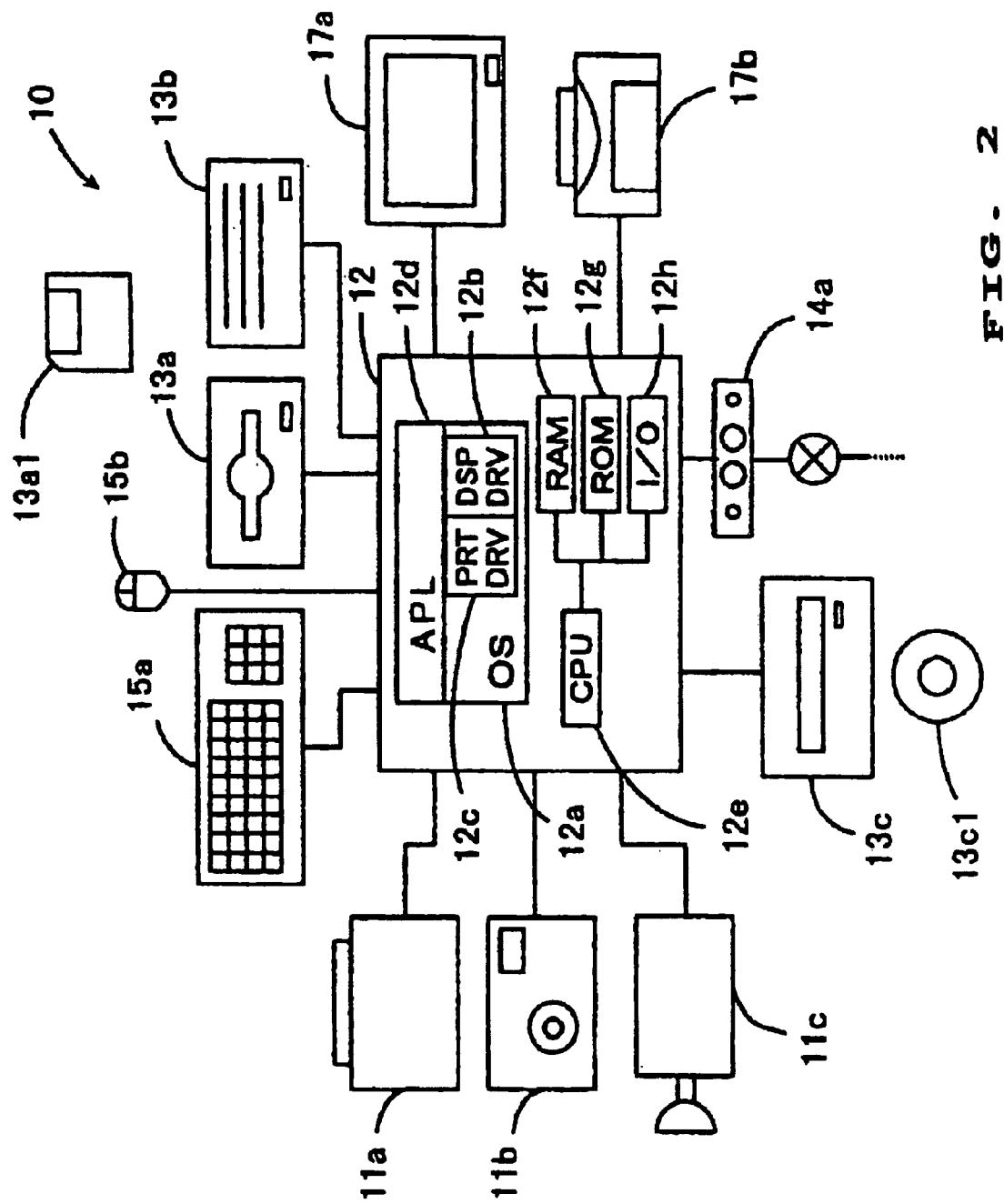
FIG. 2 is a schematic block diagram showing a computer system carrying out the image data modifying program.

The present image modifying program is carried out by an image processing system, which is realized by a computer system shown in a block diagram of FIG. 2. The computer system 10 includes a scanner 11a, digital still camera 11b and video camcorder 11c as image input devices directly or indirectly inputting image data. These are connected to a computer 12. Each of the image input devices produces image data representing an image by dot-matrix pixels and supplies the image data to the computer 12. The image data is represented in three primary colors of RGB in 256 gradations so that about 16 million and 700 thousand colors can be represented. A floppy disk drive 13a, a hard disk 13b and a CD-ROM drive 13c each serving as an external auxiliary storage are connected to the computer 12. Main programs relating to the system are recorded on the hard disk 13b. Other required programs are read from a floppy disk 13a1 or a CD-ROM 13c1 as the occasion may demand. Furthermore, a modem 14a is connected to the computer 12 to serve as a communication device connected to an external network. The modem 14a is further connected to the external network via a public telecommunication line through which software and data can be downloaded. Although an operator externally accesses via the modem 14a and the public telecommunication line in the embodiment, a LAN adapter may be provided for the operator to access the network, instead. Regarding the floppy disk drive 13a and the CD-ROM drive 13c, a recording medium itself may be exchangeable. When the recording medium on which image data is recorded is supplied, this constitutes one means of image input device. When the network is accessed via the modem 14a or LAN adapter, image data is supplied from the network. In such a case, the network constitutes one means of image input device. Additionally, a keyboard 15a for operation of the computer 12 and a mouse 15b as a pointing device are also connected to the computer.

A display 17a and a color printer 17b are provided as image output devices respectively. The display 17a has a display area of 800×600 pixels in the horizontal and vertical directions respectively so that about 16 million and 700 thousand colors can be displayed for every pixel. However, this is only one example of resolution. The resolution of the display 17a may be variable, for example, it may be 640× 480 or 1024×768 pixels. On the other hand, the color printer 17b, which is of the ink-jet printer, is capable of printing an image with dots on printing paper serving as a recording medium using four color inks of CMYK. The color printer 17b has an image density of 360×360 dpi or 720×720 dpi and can thus perform a high-density printing. The color printer 17b has two gradations as to whether color ink is applied or not. As to color inks, thin light cyan and light magenta may be added to the four colors so that a degree in the conspicuousness of dots can be reduced. A printer of the electrostatography type using color toner may be employed instead of the ink jet printer.

Predetermined programs are executed in the computer 12 so that image data inputted by the image input device is displayed or otherwise outputted by the image output device. Of these programs, an operating system (OS) 12a serving as a basic program runs on the computer 12. The operating system 12a incorporates a display driver (DSP DRV) 12b and a printer driver (PRT DRV) 12c. The display driver 12b instructs the display 17a to perform a displaying operation, whereas the printer driver 12c instructs the color printer 17b to perform a printing operation. These drivers 12b and 12c depend on the types of the display 17a and color printer 17b respectively and can accordingly be added or changed according to the respective types. Furthermore, additional functions other than standard processes may be accomplished depending on the respective types of the display 17a and printer 17b. In other words, various additional processes can be accomplished within allowable ranges while a common processing system is maintained on the standard system of the operating system 12a.

The computer 12 is provided with a CPU 12e, a RAM 12f, a ROM 12g and an I/O 12h to execute the aforesaid programs. The CPU 12e executes a basic program written on the ROM 12g while carrying out computation using the RAM 12f as a temporary work area or a setting storing area, or a program area, thereby controlling the external and internal equipment connected thereto. The application 12d is executed on the operating system 12a serving as the basic program. The application 12d has various processing contents. For example, it monitors operations of the keyboard 15a and the mouse 15b each serving as an operating device. When each device is operated, the CPU 12e controls the external equipment so that the corresponding computation processing is carried out. The CPU 12e further displays the results of processing on the display 17a or outputs them to the color printer 17b. In the above-described computer system 10, the scanner 11 serving as an image input device scans a photograph to obtain image data. The scanner 11 further obtains image data photographed by the digital still camera 11b and image data as a moving picture photographed by the video camcorder 11c.

The image based on the image data is finally displayed on the display 17a or printed by the printer 17b both of which serve as image output devices. However, intended results cannot be obtained from the image data thus obtained in many cases. This results from the difference in the characteristics of the input and output devices. In view of this, a modifying process is executed for the image data so that the image delivered from the image output device is modified. The application 12d such as photo-retouch performs the modifying process for the image data. The application 12d is realized on an image modifying program in the embodiment. The image modifying program determines a predetermined modifying parameter for performing a modifying process and adjusts the modifying parameter and the reference data to be capable of realizing a modifying process on the basis of a desired modifying parameter. The software of the application 12d is stored on the hard disk 13b and read into the computer 12 to be run in a predetermined procedure. Accordingly, from the viewpoint that the application 12d is carried out in the predetermined procedure, it constitutes an image modifying method. Furthermore, when the application 12d is introduced, a medium such as a CD-ROM 13c1 or a floppy disk 13a1 on which the application is recorded is installed. Accordingly, each of these media constitutes a medium on which the image modifying program is recorded.

Figure 3:
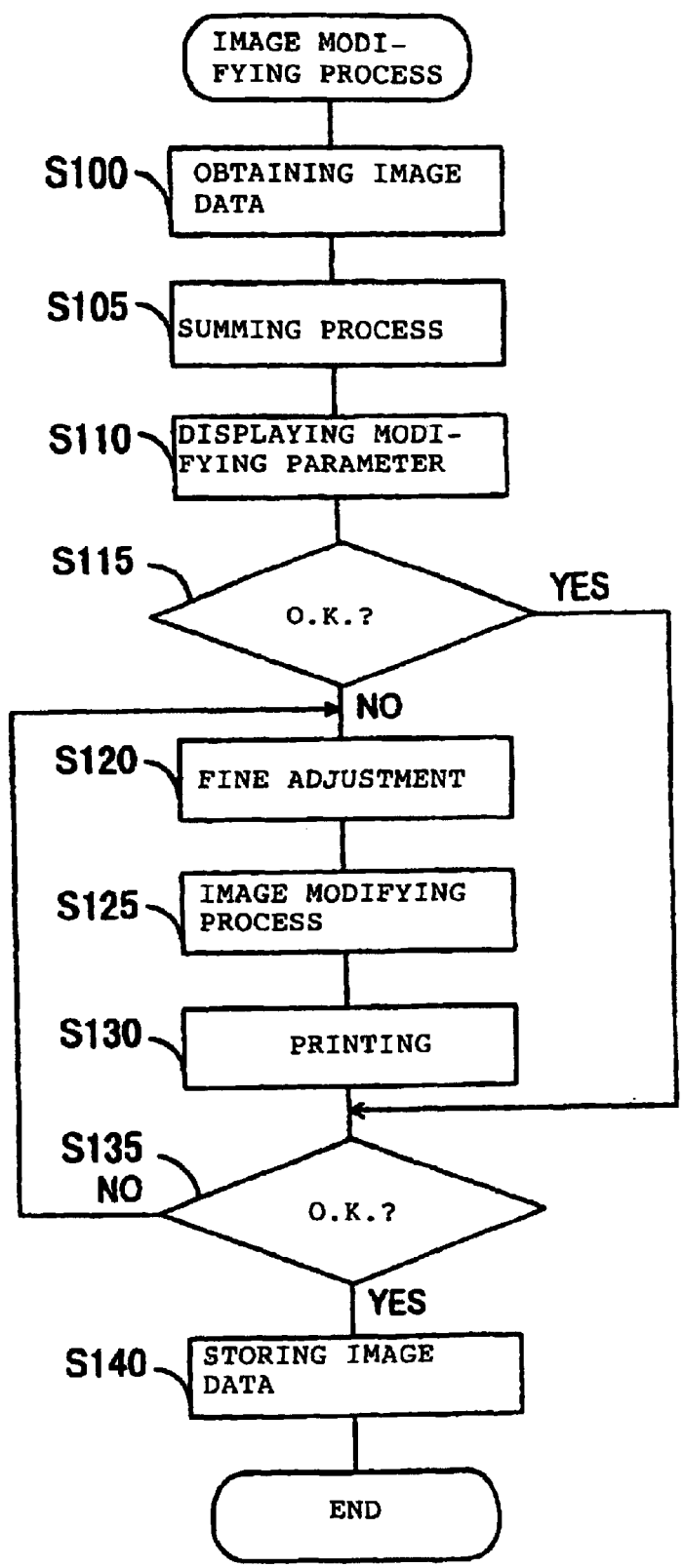
FIG. 3 is a flowchart showing the contents of the image modification processing carried out on the image modifying program.

FIG. 3 is a flowchart showing the contents of the image modification processing carried out on the image modifying program. First, an image is read from the scanner 11a to be converted to image data or image data photographed by the digital still camera 11b is transferred so that image data composed of dot-matrix pixels is obtained (step S100). Accordingly, the processing contents of step S100 constitutes the image data obtaining step C1.

The embodiment employs the arrangement in which the image data is read from the external equipment such as the scanner 11a or digital still camera 11b. However, the embodiment should not be limited to the arrangement. Image data stored in the hard disk 13b may be read.

Furthermore, image data may be inputted via a network. More specifically, only image data of a predetermined data format can be obtained and a source from which the image data is obtained should be limited. A modifying parameter is determined for a reproduced image in the obtained image data. The modifying process is carried out for the image data on the basis of the modifying parameter.

Figure 4:
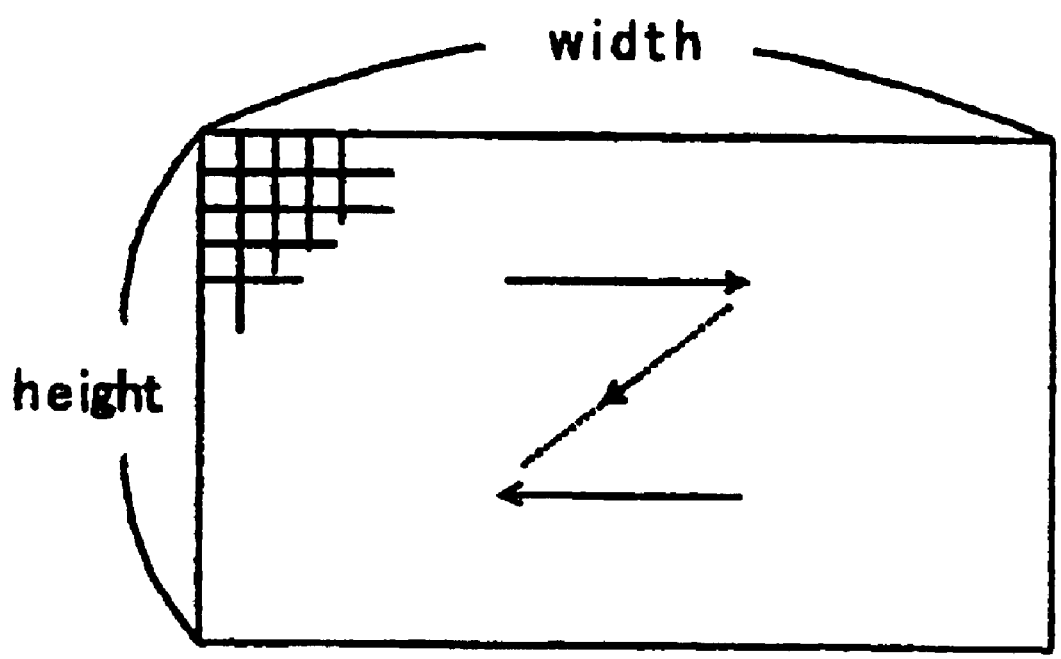
FIG. 4 shows a state where a pixel to be processed is moved.
Figure 5:
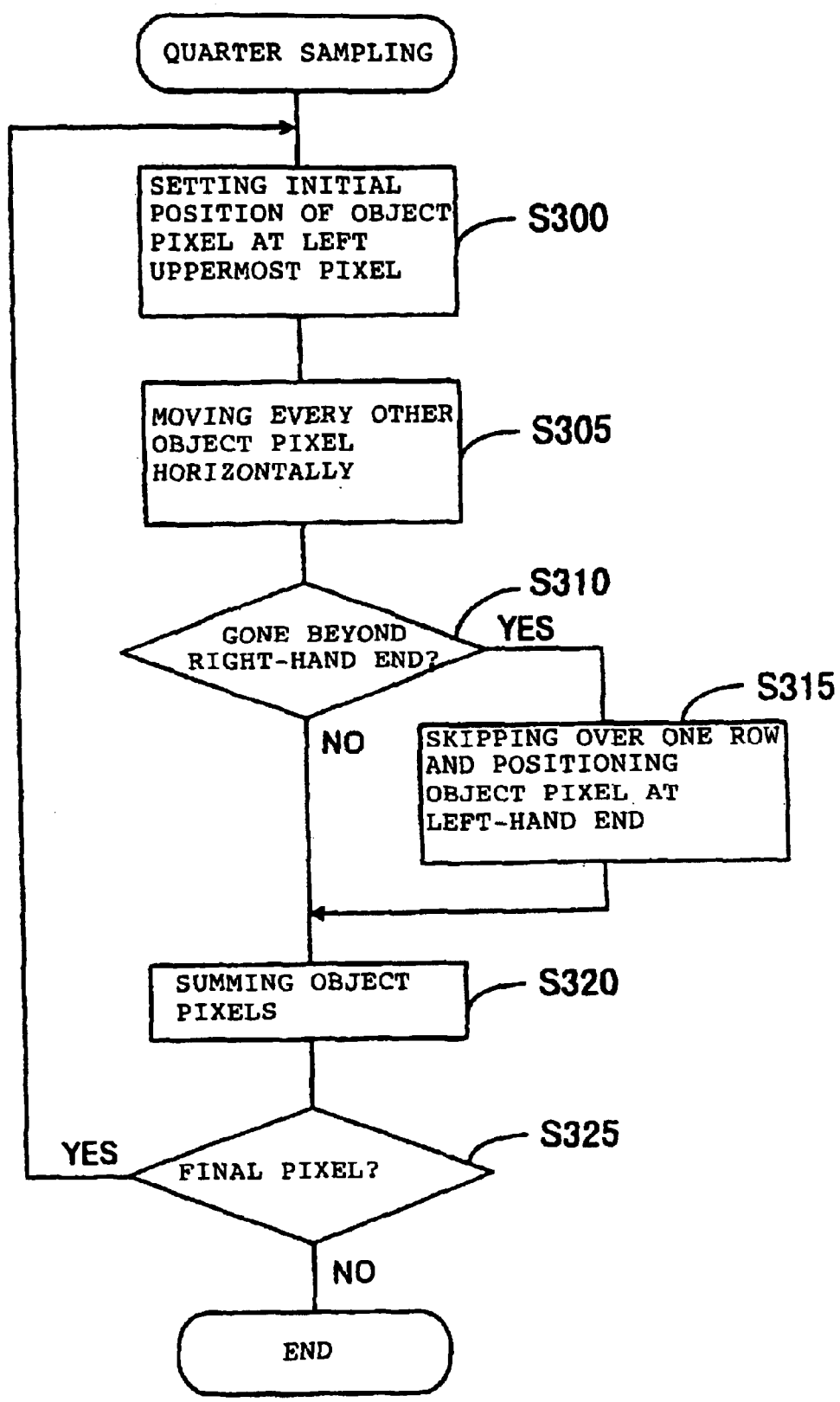
FIG. 5 is a flowchart showing the procedure for sampling a quarter of pixels to be processed.

The image data is evaluated when the modifying parameter is determined. In the evaluation of the image data, an object pixel to be evaluated is moved as shown in FIG. 4 so that a predetermined summing process is performed for the image data of the object pixel. More specifically, in the embodiment, a predetermined summation value is obtained by the aforesaid summing process in order that the image quality is grasped as feature amounts of the image such as "contrast," "brightness," "color balance," "saturation" and "sharpness." An operational processing is applied to the summation value to obtain a modifying parameter (step S105). Summation need not be carried out for all the pixels. Actually, the aforesaid feature amounts cannot exactly be judged only by the aforesaid feature amounts, and accordingly, the summing process is carried out in order that the tendency of the image quality may be obtained. In the embodiment, accordingly, the image data are sampled to be summed on a predetermined criterion. The sampling can be executed according to a predetermined rule. For example, the pixels may be sampled every other pixel in each of vertical and horizontal directions so that the number of the pixels is reduced to a quarter. FIG. 5 is a flowchart showing the procedure for sampling a quarter of all the object pixels to be processed. A left uppermost pixel is set as the object pixel to be processed at step S300. The object pixel to be processed is moved from the left one to the right one and from the upper one to the lower one. The object pixel to be processed is horizontally moved for every other pixel at step S305 and the image data of the object pixels to be processed are summed at step S320. In a case where the processing is judged to go beyond the right-hand end at step S310 when the object pixel to be processed is horizontally moved, one row to be processed is skipped over at step S315 and the left-hand end position is set as an object pixel to be processed.

Figure 6:
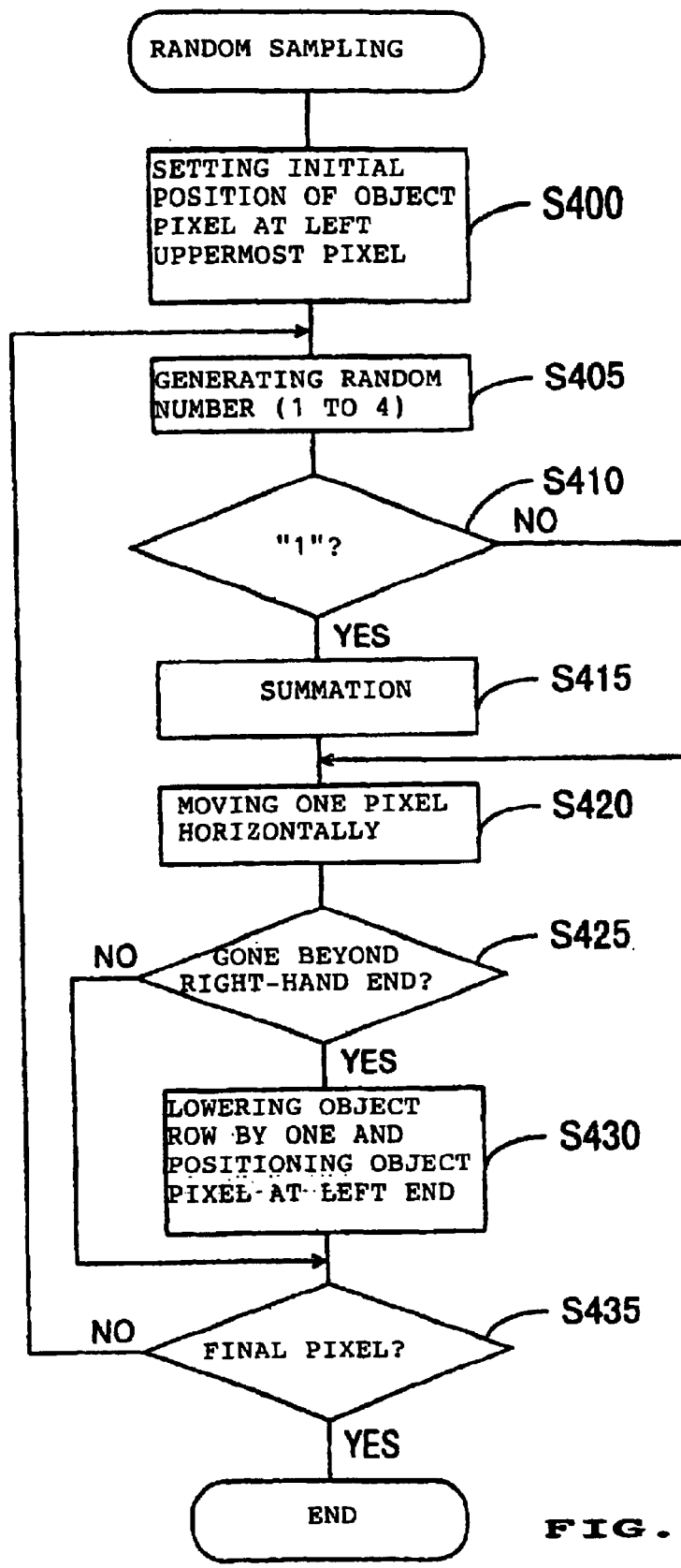
FIG. 6 is another flowchart showing the procedure for sampling a quarter of pixels to be processed.

After summation, it is judged whether the pixel is a final one at step S325. The above-described processing is repeated until the processed pixel is judged to be a final one. Thus, the object pixels to be processed are summed horizontally for every other pixel and vertically every other pixel, whereupon the number of the object pixels to be processed becomes about a quarter. Of course, the pixels may be sampled for every two pixels in the same manner so that the number of processed pixels becomes a one ninth. A thinning interval need not be equal between the vertical and horizontal directions. Furthermore, sampling need not be performed according to the predetermined rule and may randomly be performed. FIG. 6 is another flowchart showing the procedure for sampling a quarter of pixels to be processed. A left uppermost pixel is set as the object pixel to be processed at step S400. Random numbers are produced in a range of 1 to 4 at step S405. The summation is performed at step S415 only when the random number produced at step S410 is "1."

Since the object pixel to be processed is moved from the left one to the right one and from the upper one to the lower one, the object pixel to be processed is horizontally moved by one at step S420. At step S425, it is judged whether the processing has gone beyond the right-hand end. When the processing has gone beyond the right-hand end, a row to be processed is lowered by one at step S430. When one row has been skipped over, the left-hand end position is set as an object pixel to be processed. Consequently, even when the processed pixel to be processed is moved one pixel, thinning is performed at a predetermined probability using the random numbers, whereupon sampling can be performed randomly at a predetermined ratio for summation. After summation, it is judged whether the pixel is a final one at step S435.

The summation is to perform a predetermined statistical processing for the image data of the object pixel to be processed. A predetermined operational process is carried out upon determination of the object pixel to be processed. The operation is performed to perform the image modifying process, and a modifying parameter with which the modifying process is executed is computed. In the embodiment, the image such as a photograph is automatically modified. More specifically, an object is to improve the modifying parameter using the aforesaid feature amount and the image modifying process is carried out on the basis of the modifying parameter.

Figure 7:
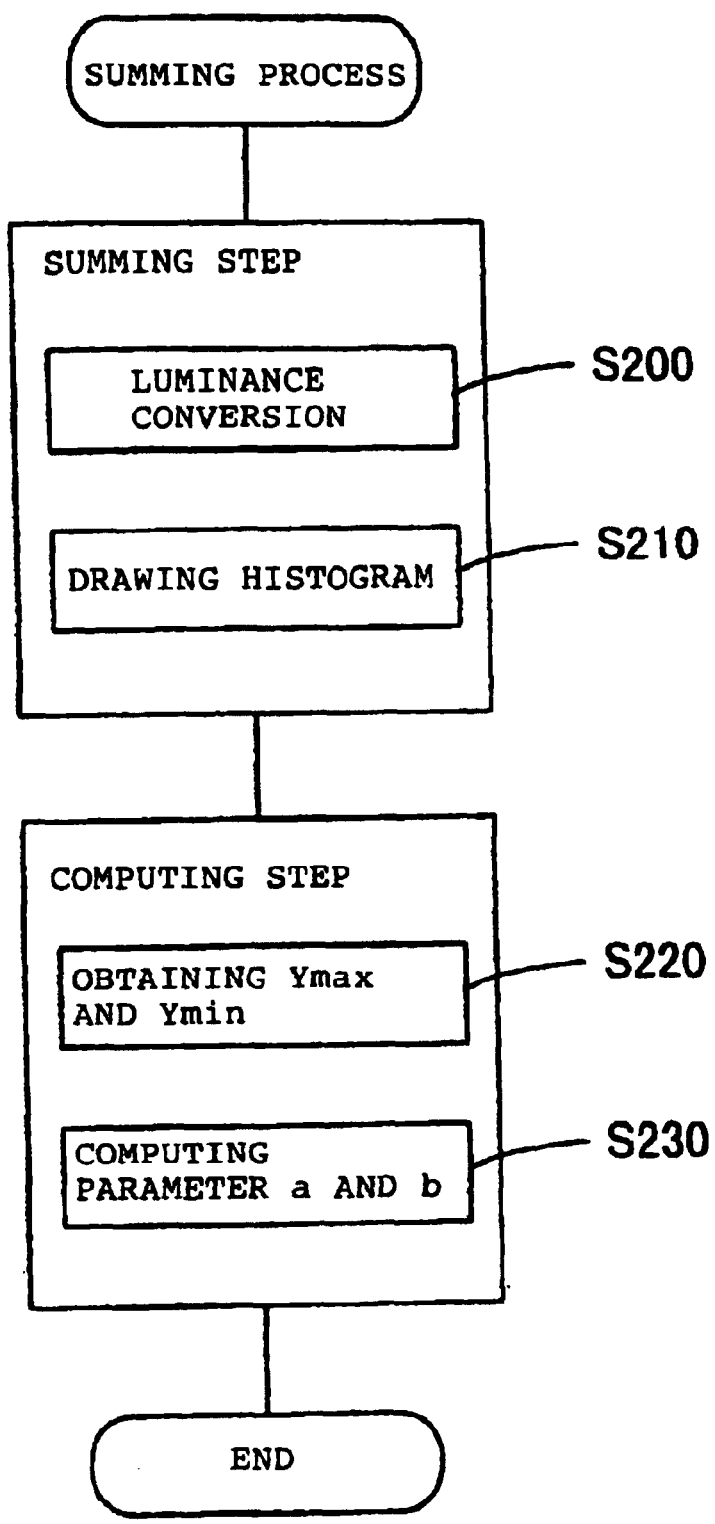
FIG. 7 is a flowchart showing the contents of the processing for obtaining a modifying parameter.

First, a manner of obtaining the modifying parameter for modifying the contrast by the image modifying process will be described with reference to FIG. 7. For easy understanding, the manner differs from an actual processing procedure in the programming and includes a summing step and a computation step.

Figure 8:
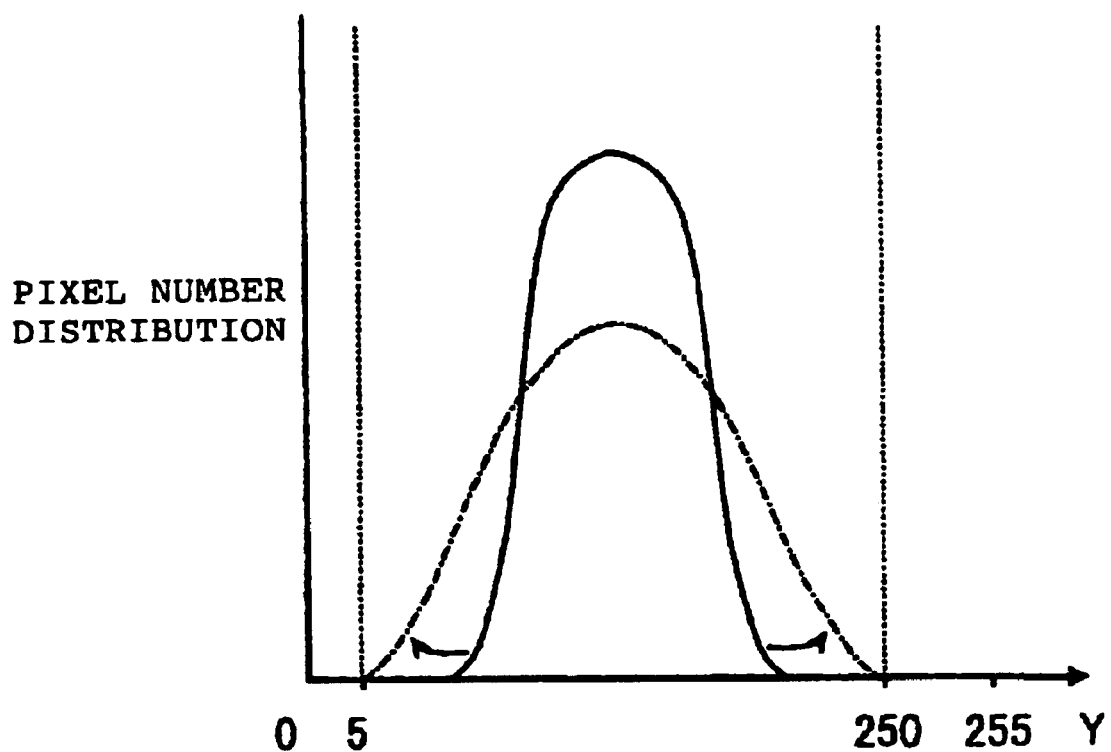
FIG. 8 shows a range of distribution in a case where luminance distribution is enlarged.

A basic principle for the modification of contrast will be described. The contrast designates a width of luminance in the whole image. When the operator wishes to modify the contrast, he or she desires to increase the width of the contrast in many cases. FIG. 8 shows a histogram of luminance distribution in each pixel of an image by solid line. In the case of distribution shown by solid line, there is a small difference between the luminance of a bright pixel and that of a dark pixel. However, the difference in the luminance between the bright and dark pixels is increased when the luminance distribution is expanded as shown by chain line, so that the width of contrast is increased.

Figure 9:
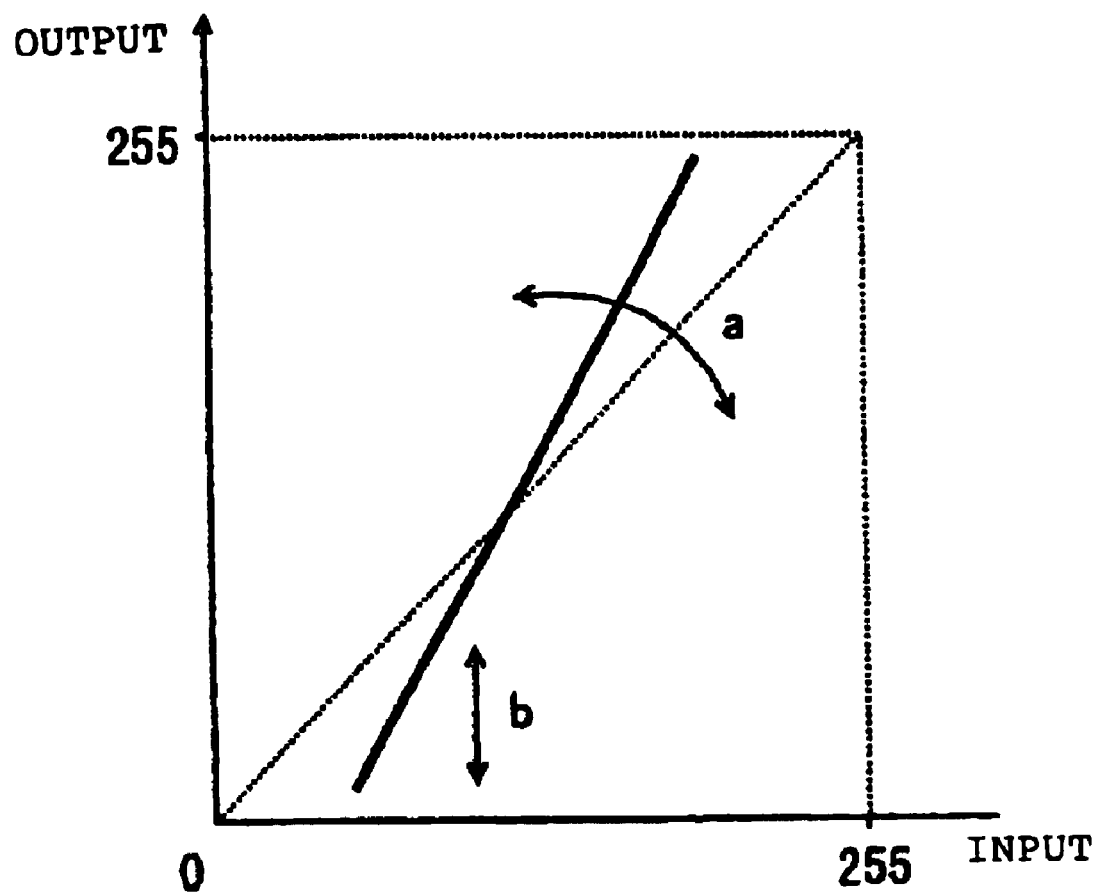
FIG. 9 shows the conversion relationship for enlarging the luminance distribution.

FIG. 9 shows a luminance conversion for expanding the contrast. When conversion is executed in the following relation between a pre-conversion luminance y and a post-conversion luminance Y:

$$Y=ay+b,$$

The difference between pixels of pre-conversion maximum luminance Ymax and minimum luminance Ymin is increased after conversion when a>1, so that the luminance distribution is expanded as shown in FIG. 8. Accordingly, the histogram as described above needs to be made and a space between the maximum and minimum values of luminance needs to be summed as the width of contrast. In this case, however, the luminance needs to be changed, and the summation can directly be performed if image data is provided with luminance as an element. However, since the image data is represented in three primary colors of RGB in 256 gradations as described above, it is provided with no direct values of luminance. Accordingly, it is necessary to perform conversion to Luv color space scheme for determining luminance. This method is, however, disadvantageous since a large amount of computation is required. Therefore, the following conversion expression is used, which is commonly adopted in television signal processing for directly determining luminance from RGB data:

$$y=0.30R+0.59G+0.11B.$$

Figure 10:
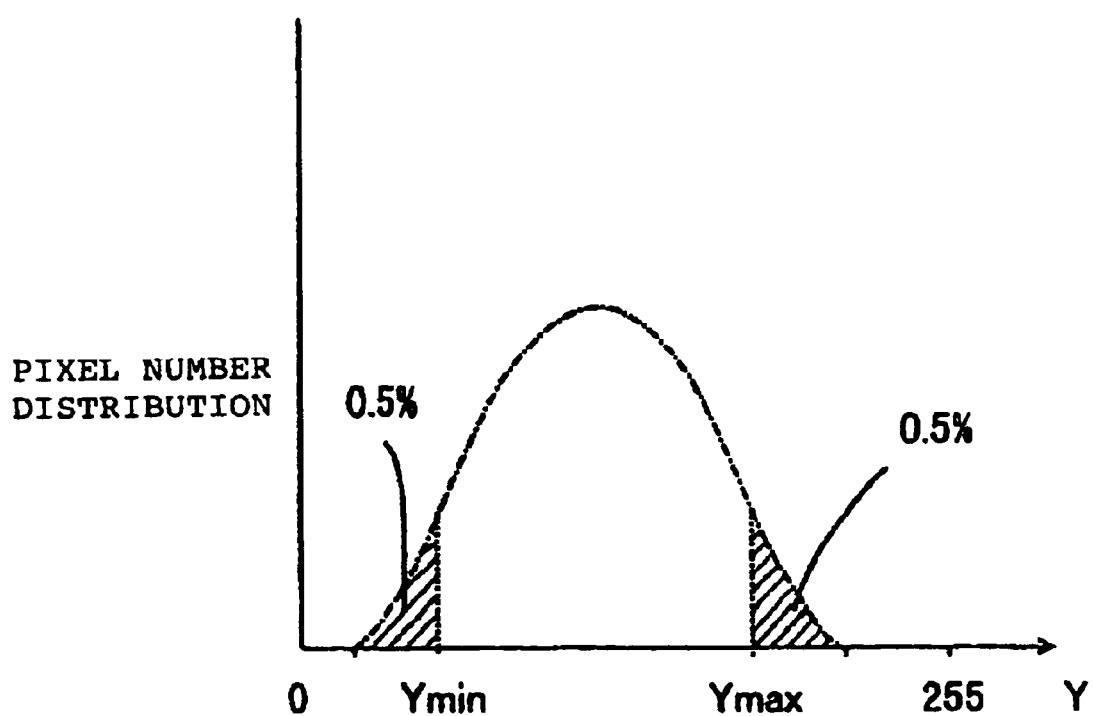
FIG. 10 shows end processing for luminance distribution and ends obtained by the processing.

More specifically, 3 bytes representative of image data of each pixel are read in while the object pixel is being moved, and the luminance y is computed on the basis of the expression. A histogram is made on the basis of the obtained luminance. Both ends of luminance distribution based on the histogram of the results of summation. The luminance distribution of a photographic image has a generally conical shape as shown in FIG. 10. Of course, there are various locations and shapes. The width of the luminance distribution depends upon locations of both ends. The both ends cannot be rendered the points where plains extend such that the distribution approximates to zero. There is a case where the distribution changes near zero, and the distribution approximates to zero limitlessly from the statistical point of view. Accordingly, the ends of the distribution are set at portions shifted inward from the sides of the largest luminance and the smallest luminance by a predetermined distribution rate in a distribution range respectively. In the embodiment, as shown in FIG. 10, the distribution rate is set at 0.5%. Of course, the rate may be changed. Thus, each of the upper and lower ends is cut by the predetermined distribution rate so that white or black points resulting from noise can be ignored. More specifically, without the aforesaid processing, even one white or black point becomes both ends of the luminance distribution. When the luminance value is in 256 gradations, the lowest end is at the zero gradation level and the uppermost end is at the 255 gradation level in many cases. However, this can be prevented when the ends of the distribution are set at portions shifted inward from the sides of the largest luminance and the smallest luminance by 0.5% of the number of pixels. The value of 0.5% of the number of pixels is computed on the basis of an actually obtained histogram. Distribution numbers are accumulated while computation is directed inward from the upper and lower end luminance values in a reproducible luminance distribution. The luminance values obtained when the values of 0.5% of the number of pixels are reached become maximum luminance Ymax and minimum luminance Ymin.

Furthermore, in the modifying process for enlarging the contrast, a preference a and offset b are determined according to the luminance distribution. For example, when setting:

$$a=255/(Y\max - Y\min) \text{ and}$$

$$b=-a \cdot Y\min \text{ or } 255-a \cdot Y\max,$$

the luminance distribution with a small width can be enlarged to a reproducible range. However, when the luminance distribution is enlarged making best use of the reproducible range, a highlighted portion sometimes becomes void and a high-shadowed portion is sometimes collapsed into a black blot. In order that these may be prevented, a non-enlarged range corresponding to the luminance value of 5 is left in each of the upper and lower ends of the reproducible range. As a result, the modifying parameters of the conversion equation are expressed as follows:

$$a=245/(Y\max - Y\min) \text{ and}$$

$$b=5-a \cdot Y\min \text{ or } 250-a \cdot Y\max.$$

In this case, the conversion is not performed in the ranges of Y<Ymin and Y>Ymax. Thus, the modifying parameters relating to the contrast are obtained. As described above, in order that the required modifying parameters a and b may finally be obtained, luminance conversion is performed for every object pixel using a computing equation (step S200):

$$y=0.30R+0.59G+0.11B.$$

A histogram is drawn on the basis of the result of luminance conversion (step S210). When the luminance conversion has been completed for all the pixels, the distribution from which the upper and lower ends are cut is determined, and the maximum luminance Ymax and the minimum luminance Ymin are obtained (step S220). The modifying parameters a and b are obtained (step S230) after the maximum luminance Ymax and minimum luminance Ymin have been obtained. Of course, a sequential processing including the luminance conversion, drawing a histogram, and determination of the maximum luminance Ymax and the minimum luminance Ymin is a predetermined computing process making use of the image data of each pixel. In this processing, the modifying parameters a and b for execution of the image processing for contrast enlargement are obtained.

The basic principle for the modification of the brightness in the image modifying process will now be described. The brightness as the feature amount of an image means an index of the contrast of the whole image, and a median of the distribution obtained from the aforesaid luminance distribution is used as an evaluation value. When the evaluation value of brightness is compared with a predetermined reference data, evaluation as to whether an image is bright or dark can be performed depending upon whether the evaluation value of brightness is large or small. Accordingly, a modifying parameter for the brightness is computed so as to resolve the deviation BR between the evaluation value and the reference data. As a result, since the histogram drawn at the step of enlarging the contrast can be used in the stage of summation, no summation needs to be performed especially. The median Ymed of the histogram is obtained at a computation stage, and the deviation BR between the median Ymed and the reference data is obtained to be used as a modifying parameter. Since a γ-curve is used to change the brightness, a correspondence between the modifying parameter and the γ-curve is determined as shown in FIG. 11. Furthermore, the value of γ may automatically be set in the same manner as in the modification of the contrast. For example, the value of γ may be obtained from:

$$y=Ymed/106 \text{ or}$$

$$\gamma=(Ymed/106)^{**}(\frac{1}{2}).$$

The basic principle for the modification of the color balance will now be described. The color balance is an index showing whether a predetermined unbalanced preference is present among the R, G and B components of image data. For example, in a case where a photograph looks reddish, it does not matter when it represents a true condition at the time of photographing. However, when it does not represent the condition, an unbalanced state has resulted from another factor. However, the unbalanced state cannot actually be understood without comparison with the true condition. Accordingly, evaluation itself is considered to be impossible.

For the modification of color balance, a histogram is drawn for each color component on the basis of image data of each pixel at the step S105 of summation. At the computation step, the histograms are compared with one another so that a modifying parameter to increase or decrease each color component such that deviation in the distribution can be resolved is determined. Since the modifying parameter is obtained using the γ-curve as in the case of brightness, the modifying parameter is caused to correspond to the value of γ.

The basic principle for the modification of saturation will now be described. The saturation means vividness in the whole image. For example, it is an evaluation as to whether an image of a thing of a primary color is vivid or grayish. The saturation is represented by the magnitude from a reference axis on a uv plane in the Luv color space scheme. However, since an amount of computation for conversion of the color space scheme is extremely large, the saturation of the pixel is simplified. The following computation is performed to obtain an alternate value of the saturation:

$$X=|G+B-2\times R|.$$

Originally, the saturation takes the value of 0 when R=G=B and the maximum value when each one of R, G and B is used or two of them is mixed at a predetermined rate. Although the saturation can directly be represented suitably, the saturation becomes maximum in the case of a single color of red or a mixed color of yellow which is a mixture of green and blue. The saturation becomes 0 when each component is uniform. Furthermore, about a half of the maximum value is reached regarding a single color of green or blue. Accordingly, for the modification of color balance, a histogram is drawn for an alternate value X of the saturation on the basis of image data of each pixel at the step S105 of summation. The histogram of the alternate value X of saturation is distributed in the range between the minimum value of 0 and the maximum value of 511. Accordingly, an upper range of 16% is obtained from the distribution of the alternative value X of the saturation. It is assumed that the minimum saturation S within the range represents the saturation of the image.

On the other hand, the obtained saturation of the image is emphasized or weakened in the following manners. When each component is the component value of a hue component having a relation of approximate equivalence between components such as the RGB color space, it is gray and achromatic where R=G=B. When it is considered that a component taking the minimum value in each value of RGB does not affect the hue of each pixel but merely reduces the saturation, the minimum value in each component is subtracted from all the component values so that a difference value is obtained. The difference value is enlarged according to a degree of emphasis. That is, a magnification is rendered a modifying parameter with respect to the saturation. However, the brightness in the whole image will be changed in this case. Accordingly, in order that the difference value may be emphasized without change in the brightness, the following computation is performed when the image is modified with Sratio serving as the modifying parameter:

$$R'=R+(R-Y)\times Sratio$$

$$G'=G+(G-Y)\times Sratio$$

$$B'=B+(B-Y)\times Sratio$$

The saturation emphasizing modifying parameter Sratio is required to be increased when the aforesaid minimum saturation S is rendered small. The saturation emphasis index S' is determined as follows:

when S<92, $$S'=-Sx(10/92)+50$$

when 92≤S<184, $$S'=-Sx(10/46)+60$$

when 184≤S<230, $$S'=-Sx(10/23)+100$$

when 230≤S, $$S'=0.$$

The conversion from the saturation index S' to the saturation emphasis index Sratio is obtained as:

$$Sratio=(S'+100)/100.$$

Of course, this operation is executed at the computation stage. Sratio=1 when S'=0. In this case, the saturation is not emphasized.

Lastly, the basic principle for the modification of sharpness will be described. The sharpness serving as a feature amount of an image is evaluated by means of an edge amount. When an image is composed of dot-matrix pixels, the difference of image data is increased between adjacent pixels in an edge portion of the image. The difference is a luminance gradient and is referred to as edge amount. The luminance of each pixel is computed for the drawing of a histogram, as described above. The edge amount is obtained from the difference value between each pixel and an adjacent pixel at the summation stage. The X-direction difference value fx and the Y-direction difference value fy are represented as:

$$fx=f(x+1,y)-f(x,y)$$

$$fy=f(x,y+1)-f(x,y)$$

Accordingly, the edge amount Ddif which is the size of a vector g (x, y) having these difference values as components is represented as:

$$Ddif=|g(x,y)|=(fx2+fy2)**(\frac{1}{2})$$

Of course, the pixels are arranged vertically and horizontally into a gridiron. The difference between each pixel and each of eight adjacent pixels is represented as vector, and the sum of vectors may be determined to be an image change degree.

At the summation stage of step S105, the edge amount Ddif is accumulated and lastly divided by the number of accumulated pixels so that an average value Ddif_ave. On the other hand, the edge enhancement process uses a general unsharp mask. Accordingly, the modifying parameter is obtained as the edge enhancement Eenhance from the following equation at the computation stage:

$$Eenhance=4\times Ddif\_ave/100.$$

In the subsequent image modification, the edge enhancement process is carried out for all the pixels using the unsharp mask. The luminance Y' after enhancement is computed relative to the luminance Y of each pixel before enhancement from:

$$Y'=Y+Eenhance-(Y-Yunsharp)$$

where Yunsharp represents an unsharp mask processing applied to the image data of each pixel, and the unsharp mask is an accumulated value in which weighting for the central object pixel and peripheral pixels has been changed into a centrally emphasized one.

Figure 12:
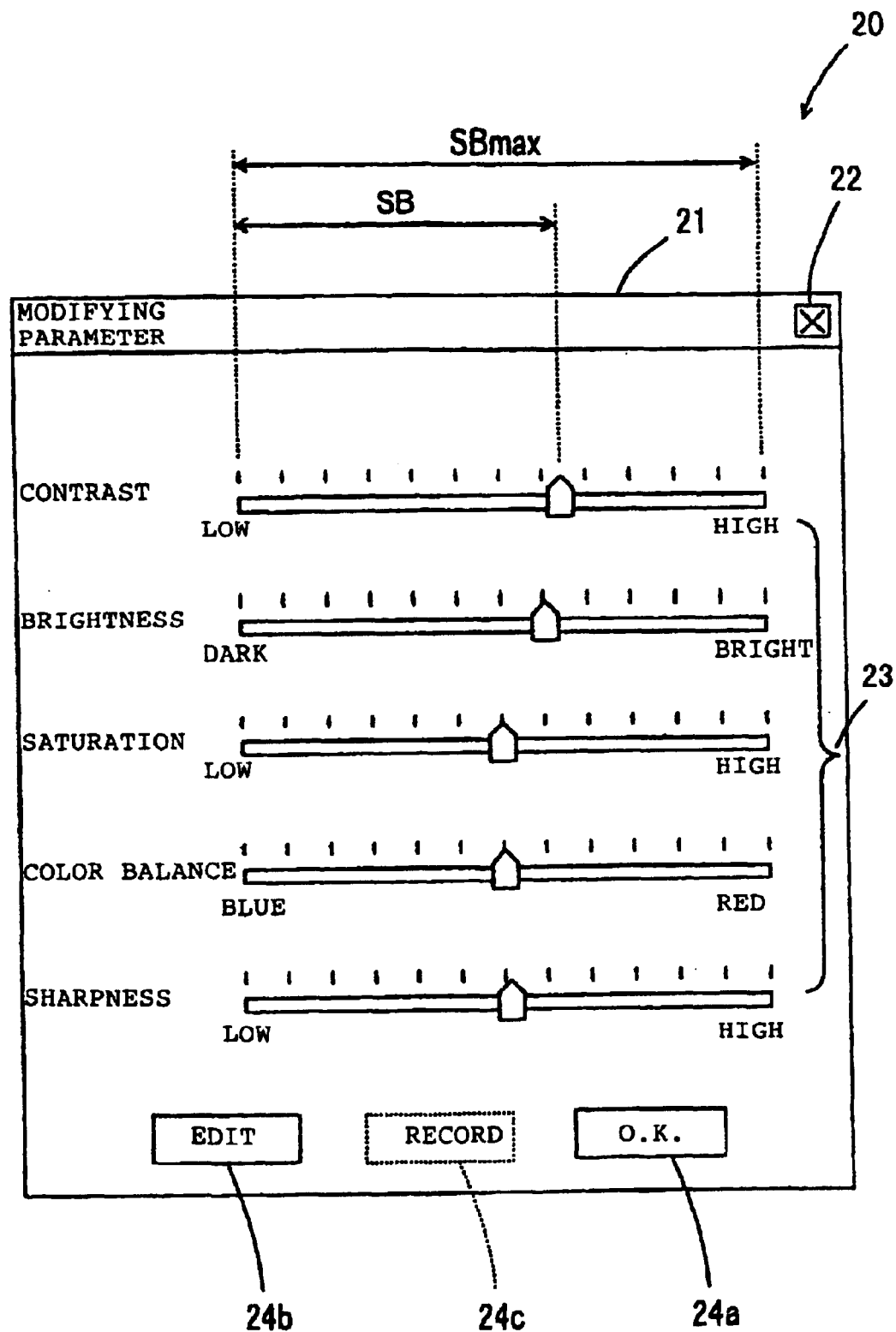
FIG. 12 shows an operating screen on which edit of reference data is carried out.

The modifying parameters of contrast, brightness, color balance, saturation and sharpness are obtained in the predetermined processing at step S105 as described above. The obtained modifying parameters are displayed on the display 17a so as to be recognized by the operator (step S110) as shown in FIG. 12. This screen display 20 is displayed as a window display, and the characters of "modifying parameter" are displayed on the uppermost title column 21 as a caption representative of the displayed contents, and a button 22 is displayed for closing the window display. Characters of "contrast," "brightness," "color balance," "saturation" and "sharpness" representative of image quality to be corrected are vertically arranged in the left in the window. A slide bar 23 is displayed on the right of each image quality. Each slide bar 23 is horizontally moved by the mouse 15b. A location and a slidable width can be obtained on the application 12d. The left and right ends of each slide bar 23 indicate the contents of the sliding operation. In the contrast, saturation and sharpness, the left end indicates "low" and the right end indicates "high." In the brightness, the left end indicates "dark" and the right end indicates "bright." In the color balance, the left end indicates "blue" and the right end indicates "red." The displayed slide bar 23 is a modifying parameter computed through the summation process for each image quality and corresponds to the value of the modifying parameter at the central position. The slide bar 23 indicates the zero times value at the left end and the twice value at the right end. However, it is only one example and any allocation is possible. For example, a scale may previously be determined.

A correction parameter is displayed as a caption here in this case and the correction parameter is displayed as the slide bar. Since displayed as the slide bar, the correction parameter is not conscious for the operator but provides interface which is the same as giving image modifying instructions. Accordingly, the instructions to change correction parameters and image correcting instructions are united, they are substantially the same. Two or three command buttons 24a to 24c are displayed on the lower part of the window. A lower right-hand command button is an OK button 24a. The operator operates the OK button 24a when it is determined that the slide bar 23 is giving proper instructions. A lower left-hand command button is an edit button 24b. The edit button is operated when the slide bar 23 on display is changed. A lower central command button is a record button 24c. Record is reserved as will be described later and the record button 24c is operated when the operator wishes to return an image to any stage. More specifically, each modifying parameter is adjusted by horizontally moving the slide bar 23 in the embodiment so that the work for fine adjusting the modifying parameter is rendered more concrete for the operator. For example, the slide bar is moved in the directions of STRONG and WEAK, whereupon the fine adjustment work is substituted by a concrete and intuitive work.

The following computation is performed when the modifying parameter is actually changed. When an amount of slide is set so that it can be increased or decreased in a range twice as large as the modifying parameter P with the non-corrected state serving as the central position of the slide bar, Sbmax is the maximum movement range, SB is an actual amount of slide from the actual left-hand side, and P is the modifying parameter P. A modifying parameter P' to be changed is represented as:

$$P' = 2 \times P \times SB/SB \text{ max.}$$

According to this expression, the modifying parameter P' can be changed in the range of 0 to 2 times larger than the first modifying parameter P.

Figure 13:
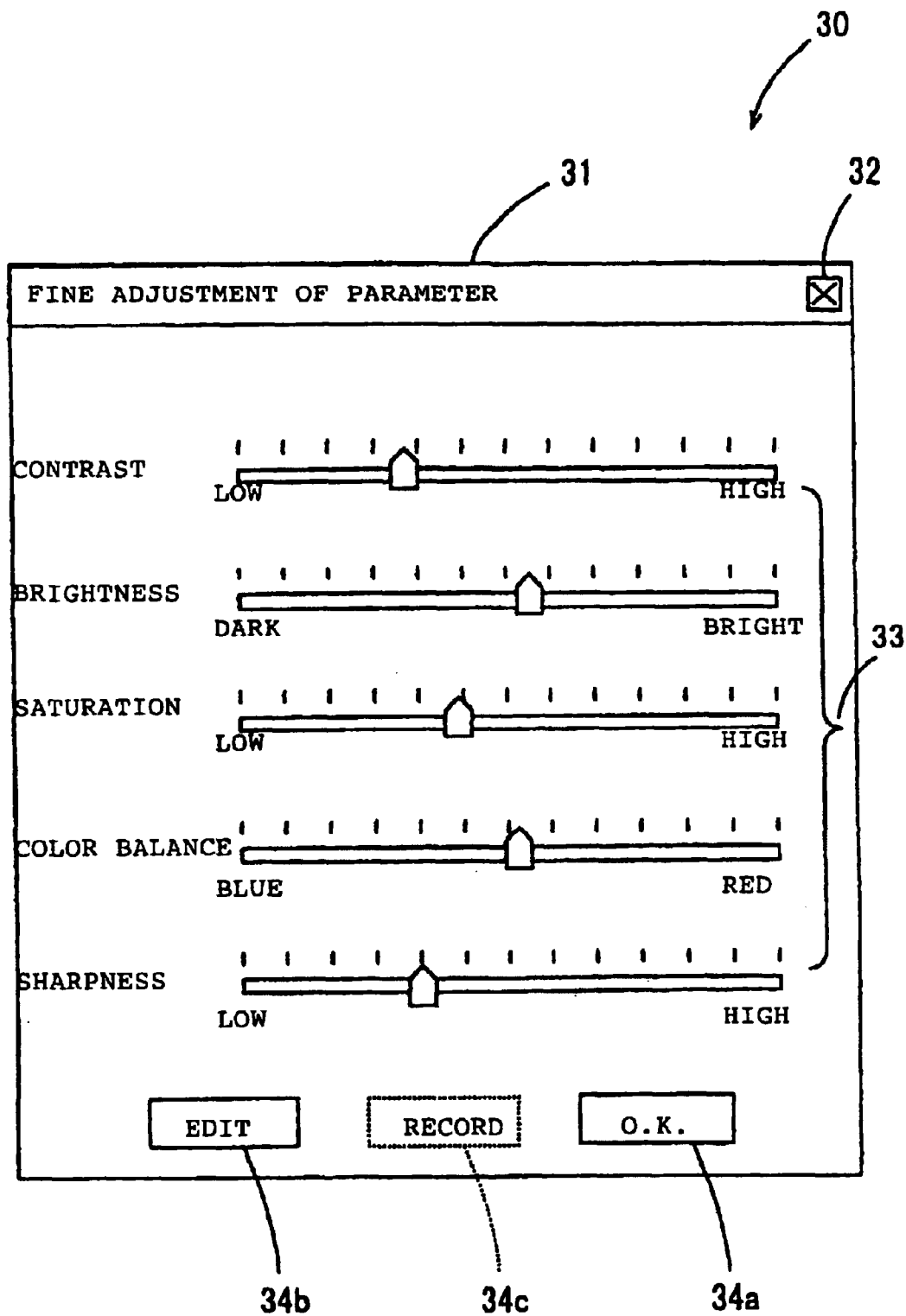
FIG. 13 shows an operating screen on which edit of image fine adjustment is carried out.

On the other hand, there is a case where the range of 0 to 2 times larger than the first parameter P is too broad although there is a possibility of change in the modifying parameter. Since the preference of the operator is reflected, an automatically judged modifying parameter may slightly be adjusted. Accordingly, the range which can be modified by the slide bar maybe limited to ±10% of the modifying parameter. FIG. 13 shows a screen display 30 in this case, and the movement of the slide bar instructs fine adjustment for modification of image quality. The screen display 30 is substantially the same as the screen display 20. A title column 31, button 32, slide bar 33, three command buttons 34a, 34b and 34c are displayed. The characters "fine adjustment of modifying parameter" are displayed as a caption of the uppermost title column 31. Furthermore, a slide bar 33 displayed here gives an instruction to fine-adjust each modifying parameter and corresponds, at the central position, to the state where the modifying parameter is not modified, and indicates the values of 10% decrease at the left end and 10% increase at the right end. However, this is only one example, and ranges of increase and decrease may be allocated optionally.

In order that the central position may indicate the state where no correction is added and an amount of slide SB from the left end may be set so as to be increased and decreased in the range of ±10% of the modifying parameter P:

$$P' = 0.9 \times P + 0.2 \times P \times SB/SB \text{ max.}$$

As a result, the range of variation of the modifying parameter is ±10% even when the slide bar is moved to the maximum. As a result, even a beginner can set relatively easily. Furthermore, the modifying parameter is firstly displayed as shown in FIG. 12. Whether this modifying parameter is used is determined. When the parameter is modified, the operation for fine adjustment may be performed as shown in FIG. 13.

An operation to directly change the modifying parameter has heretofore been described. However, the stage to introduce the modifying parameter through the above-described stage may be modified so that different modifying parameters are computed, whereby the preference of the operator is reflected. For example, when the value of γ as the modifying parameter of the brightness is set, computation is performed using the median Ymed of the luminance as described above:

$$\gamma = Ymed/106$$

The value of 106 which is the reference data in this case is increased and decreased so that the value of modifying parameter γ changes. For example, when a reference value Th is used instead of the fixed value 106:

When $Th = 0.9 \times (106) + 0.2 \times (106) \times SB/SB$ max, $$\gamma = Ymed/Th$$

As a result, the reference data of "106" is changed in the range of ±10% by the movement of the slide bar such that the computed modifying parameter γ is varied. Thus, the preference of the operator can be reflected. Of course, such a technique can be used when a modifying parameter is computed regarding another image quality. In this case, however, the processing is once repeated from the summation process at step S105.

Figure 14:
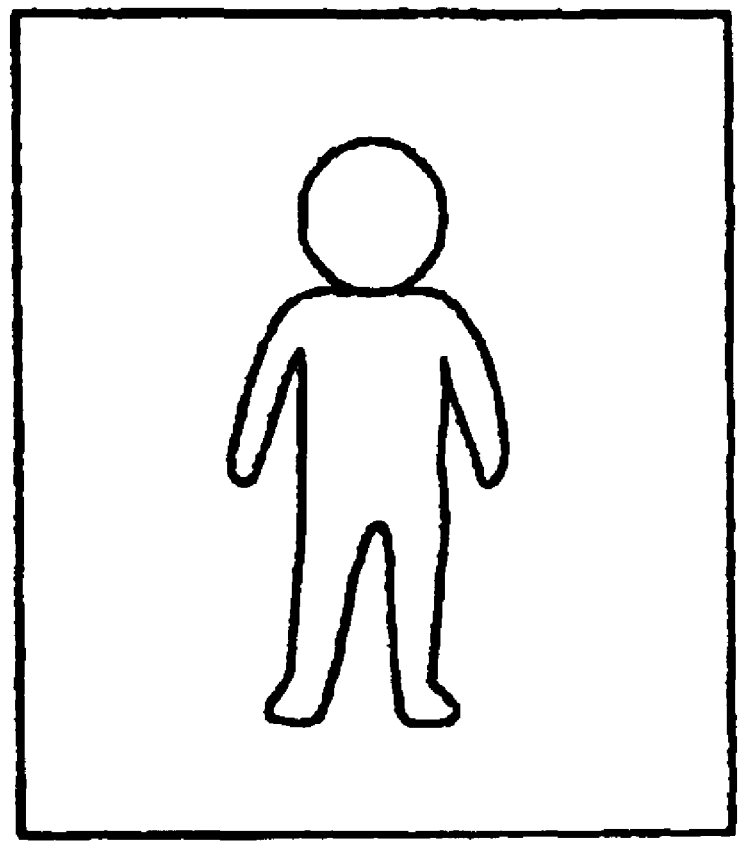
FIG. 14 schematically shows an image.

When data which is the reference in computation of the modifying parameter is changed, the value thereof agrees precisely to the preference of the operator in many cases. More specifically, when the reference is usually used, the value agrees with the preference of the operator even if different images are used. Accordingly, the instructions of change given as described above are recorded on the hard disk 13b or the like and are read when the modifying parameter is computed, so that the parameter may be reflected in the computation. Furthermore, as shown in FIG. 14, an image of image data obtained by compensating the image data according to the modifying parameter may be displayed, and the post-modification image may be informed of at a real time so that the fine adjustment is carried out on the basis of screen display in FIGS. 12 and 13. The operator confirms the contents of the displayed modifying parameter or the above-described image and the image modifying process is carried out according to the modifying parameter so that whether the image is modified is determined (step S115).

When it is determined that modification executed with the aforesaid modifying parameter being maintained is not suitable for the preference of the operator, the slide bar display in FIG. 12 or 13 is operated to execute adjustment (step S120). For example, when "contrast" is to be emphasized, the slide bar of "contrast" is moved toward "HIGH" so that fine adjustment is carried out. When "contrast" is to be weakened, the slide bar is moved toward "LOW." Such fine adjustment is carried out for "brightness," "saturation," "color balance" and "sharpness" if necessary. Upon completion of fine adjustment of the modifying parameter, the image modifying process is carried out for the image data on the basis of the fine-adjusted modifying parameter (step S125). The image data to which the image modifying process has been applied is delivered to the printer driver 12c to be printed by the color printer 17b (step S130). At this time, the operator judges whether the result of printing is fine or suitable for his or her preference (step S135). When the result of printing suitable for the operator's preference has been obtained, the corrected image data is stored (step S140), so that the image modifying process is completed.

The image data may be restored to an image before execution of the image modifying process using the modifying parameters with which the image modifying process has been carried out. For preparation, at step S125, the modifying parameters are sequentially stored on a record table in synchronization with the image modification as shown in FIG. 15. In a case where a record button 24c in FIG. 12 is operated when the image data is desired to be restored to the image before execution of the image modifying process, the record table is displayed so that desired data is selected. Then, the slide bar 23 of the modifying parameter is moved according to the selected data, so that the image modifying process is carried out in the same manner as described above. In this case, the image modifying process is carried out by giving the modifying parameter with initial image data usually serving as a reference. However, the image modifying process is sometimes carried out for the image data to which the image modifying process has already been applied once. In this case, in order that the image data may be restored to any stage of the image data, two techniques can be employed. The first one is a technique of re-executing the image modification from the initial image data to any stage by using the modifying parameters from one to another. On the other hand, the other is a technique of carrying out an image modification of inverse transformation for the final image data. However, since the computation processing of the image modification does not have an accurate reversibility in many cases, the former technique can reproduce the image more accurately than the latter one.

On the other hand, when the result of printing is not good at step S135, the computer returns to step S120 to repeat a course of processes including fine adjustment of modifying parameters, the image modifying process at step S125, the printing at step S130, and the confirmation of the result of printing, whereupon the result of printing more suitable for the operator's preference can be obtained.

As described above, the predetermined summation process is carried out for each pixel of the image data and determines the modifying parameters at steps S105 to S110. The processing contents of the steps S105 to S110 constitute the modifying parameter computing step C2. At steps S115 to S120, fine adjustment is applied to the modifying parameters so that the image to be modified is suited for the operator's preference. The result of fine adjustment is determined at steps S130 to S135. The processing contents of these steps S115 to S120 and S130 to S135 constitute the modifying parameter correcting step C3. The processing contents of step S125 at which the image modifying process is carried out on the basis of the modifying parameters constitute the image data modifying step C4. In the embodiment, the image data to which the image modifying process has been applied is outputted via the printer driver 12c by the color printer 17b at step S130, so that the degree of modification is confirmed. Of course, the image data may be delivered to the display driver 12b to be displayed on the display 17a.

The operation of the image modifying apparatus will be described. The operator starts the image modifying program on the computer 12. An image or image data is inputted from the scanner 11a or digital still camera 11b to the computer 12 (step S100). Upon start of the image modifying process, a predetermined summation processing is carried out for the inputted image data (step S105). The modifying parameters determined according to the predetermined reference data are displayed on the display 17a in a format as shown in FIG. 12 or 13 (step S110). An image on the basis of the result of modification performed with the modifying parameters may be displayed at this time as shown in FIG. 14. The operator then confirms the image quality of the displayed image. When the operator determines that the image quality is not suitable for his or her preference (step S115), fine adjustment is applied to the reference data and the modifying parameters as shown in FIG. 12 or 13 (step S120).

The image modifying process is carried out upon completion of the fine adjustment (step S125), so that the image data is compensated and an image is printed on the basis of the compensated image data (step S130). While the result of printing is being confirmed, the fine adjustment of the modifying parameters or reference data is repeated until a desirably modified image can be obtained (steps S120 to S135). As described above, the image data is obtained (step S100) and the predetermined summation process is carried out for the obtained image data (steps S105). The modifying parameters are automatically determined on the basis of the predetermined reference data which can ensure a predetermined image quality in the result of the summation processing and the image (step S110). As a result, an image modified to a certain degree can be obtained at this stage. In order that an image more suitable for the operator's preference may be obtained, the fine adjustment is applied to the modifying parameters from which the image of the predetermined quality can be obtained. Consequently, an image modified so as to be suitable for the operator's preference can be obtained more easily.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A medium on which an image modifying program is recorded for carrying out image processing on a computer on the basis of image data in which an image is composed of dot-matrix pixels, thereby performing image modification, the program accomplishing on the computer:

a modifying parameter computing function of performing a predetermined computing process using image data of each pixel to obtain a modifying parameter for changing a picture quality on the basis of predetermined image processing;

a modifying parameter correcting function of obtaining an image modifying instruction by an operator to correct the modifying parameter on the basis of the image modifying instruction; and an image data correcting function of performing the predetermined image processing for the image data on the basis of the modifying parameter, wherein the modifying parameter correcting function obtains a fine adjustment parameter for changing the modifying parameter by fine adjustment to correct the modifying parameter on the basis of the obtained fine adjustment parameter.

2. The medium according to claim 1, wherein the modifying parameter computing function collects by sampling the image data of each pixel according to a predetermined criterion to perform computation on the basis of results of collection, thereby determining the modifying parameter.

3. The medium according to claim 1 or 2, wherein the modifying parameter correcting function and an image processing function are repeated on the basis of the image data which has gone through the image processing.

4. The medium according to claim 3, wherein the modifying parameter correcting function records the image modifying instruction by the operator to reproduce the image data at any stage using a recorded image modifying instruction.

5. The medium according to claim 1, wherein the modifying parameter correcting function changes the operation processing in the modifying parameter computing function to thereby change the modifying parameter to be obtained.

6. An image modifying apparatus which carries out image processing on the basis of image data in which an image is composed of dot-matrix pixels, thereby performing image modification, the apparatus comprising:

a modifying parameter computing unit which performs a predetermined computing process using image data of each pixel to obtain a modifying parameter for changing a picture quality on the basis of predetermined image processing;

a modifying parameter correcting unit which obtains an image modifying instruction by an operator to correct the modifying parameter on the basis of the image modifying instruction; and an image data correcting unit which performs the predetermined image processing for the image data on the basis of the modifying parameter, wherein the modifying parameter correcting unit obtains a fine adjustment parameter for changing the modifying parameter by fine adjustment to correct the modifying parameter on the basis of the obtained fine adjustment parameter.

7. The apparatus according to claim 6, wherein the modifying parameter computing unit collects by sampling the image data of each pixel according to a predetermined criterion to perform computation on the basis of results of collection, thereby determining the modifying parameter.

8. The apparatus according to claim 6 or 7, wherein the modifying parameter correcting unit and an image processing unit are repeatedly operated on the basis of the image data which has gone through the image processing.

9. The apparatus according to claim 8, wherein the modifying parameter correcting unit records the image modifying instruction by the operator to reproduce the image data at any stage using a recorded image modifying instruction.

10. The apparatus according to claim 6, wherein the modifying parameter correcting unit changes the operation processing in the modifying parameter calculating unit to thereby change the modifying parameter to be obtained.

11. A method of image modification for carrying out image processing on the basis of image data in which an image is composed of dot-matrix pixels, thereby performing image modification, the method comprising the steps of:

performing a predetermined computing process using image data of each pixel to obtain a modifying parameter for changing a picture quality on the basis of predetermined image processing;

obtaining an image modifying instruction by an operator to correct the modifying parameter on the basis of the image modifying instruction; and performing the predetermined image processing for the image data on the basis of the modifying parameter, wherein a fine adjustment parameter is obtained for changing the modifying parameter by fine adjustment when an instruction for changing the modifying parameter is obtained, and the modifying parameter is corrected on the basis of the obtained fine adjustment parameter.

12. The method according to claim 11, wherein the image data of each pixel is collected by sampling according to a predetermined criterion, and computation is performed on the basis of results of collection to determine the modifying parameter.

13. The method according to claim 11 or 12, wherein the modifying parameter is calculated on the basis of the image data which has gone through the image processing to correct the modifying parameter, and the image processing is repeatedly performed.

14. The method according to claim 13, wherein the image modifying instruction by the operator is recorded and the image data at any stage is reproduced using a recorded image modifying instruction.

15. The method according to claim 12, wherein the operation processing is changed so that an instruction for changing the modifying parameter is obtained, whereby the modifying parameter to be obtained is changed.

* * * * *